(12) United States Patent
Cao et al.

(10) Patent No.: US 9,815,211 B2
(45) Date of Patent: Nov. 14, 2017

(54) ROTARY JOINT OF A ROBOT AND THE ROBOT INCLUDING THE SAME

(71) Applicant: ABB Schweiz AG, Baden (CH)

(72) Inventors: Xiaodong Cao, Shanghai (CN); Tao Feng, Shanghai (CN); Zhu Zhu, Shanghai (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/786,275

(22) PCT Filed: Jun. 17, 2013

(86) PCT No.: PCT/CN2013/077325
§ 371 (c)(1),
(2) Date: Oct. 22, 2015

(87) PCT Pub. No.: WO2014/201606
PCT Pub. Date: Dec. 24, 2014

(65) Prior Publication Data
US 2016/0089795 A1    Mar. 31, 2016

(51) Int. Cl.
*B25J 19/00* (2006.01)
*B25J 17/00* (2006.01)
*H02G 11/02* (2006.01)

(52) U.S. Cl.
CPC ........... *B25J 19/0041* (2013.01); *B25J 17/00* (2013.01); *B25J 19/0029* (2013.01); *H02G 11/02* (2013.01)

(58) Field of Classification Search
CPC .... B25J 19/0041; B25J 19/0029; B25J 19/00; B25J 17/00; H02G 11/02

USPC .......................................... 439/15; 74/490.05
See application file for complete search history.

(56) References Cited

U.S. PATENT DOCUMENTS

| 4,978,191 A | 12/1990 | Hasegawa et al. |
| 5,210,378 A | 5/1993 | Smith et al. |
| 5,384,431 A | 1/1995 | Tusques |
| 2010/0237178 A1 | 9/2010 | Nakamura et al. |

FOREIGN PATENT DOCUMENTS

| CH | 700245 B1 | 7/2010 | |
| CN | 1676289 A | 10/2005 | |
| CN | 101003132 A | 7/2007 | |
| CN | 101772403 A | 7/2010 | |
| CN | 102128343 A | 7/2011 | |
| EP | 0924815 A1 | 6/1999 | |
| EP | 2006056 A1 | 12/2008 | |
| GB | 2164506 A | 3/1986 | |
| JP | 7-108485 | * 4/1995 | .............. B25J 19/00 |
| JP | 2012240123 A | 12/2012 | |

OTHER PUBLICATIONS

Machine Translation of JP 7-108485.*

(Continued)

*Primary Examiner* — Harshad Patel
(74) *Attorney, Agent, or Firm* — Taft Stettinius & Hollister LLP

(57) ABSTRACT

A rotary joint includes a hollow gear and a hollow wiring unit having a first flexible printed circuit board therein, to allow hose to pass through both the hollow gear and the hollow wiring unit. A robot includes the rotary joint.

16 Claims, 11 Drawing Sheets

(56) References Cited

OTHER PUBLICATIONS

ISA/CN International Search Report issued Mar. 27, 2014 re PCT Application No. PCT/CN2013/077325, filed Jun. 17, 2013.
Chinese Patent Office Action issued Jun. 20, 2016 re Application No. 201380076045.0 of ABB Technology Ltd.
Extended European Search Report for EP Application Number 13887466.4, Apr. 21, 2017, 9 pages.

* cited by examiner

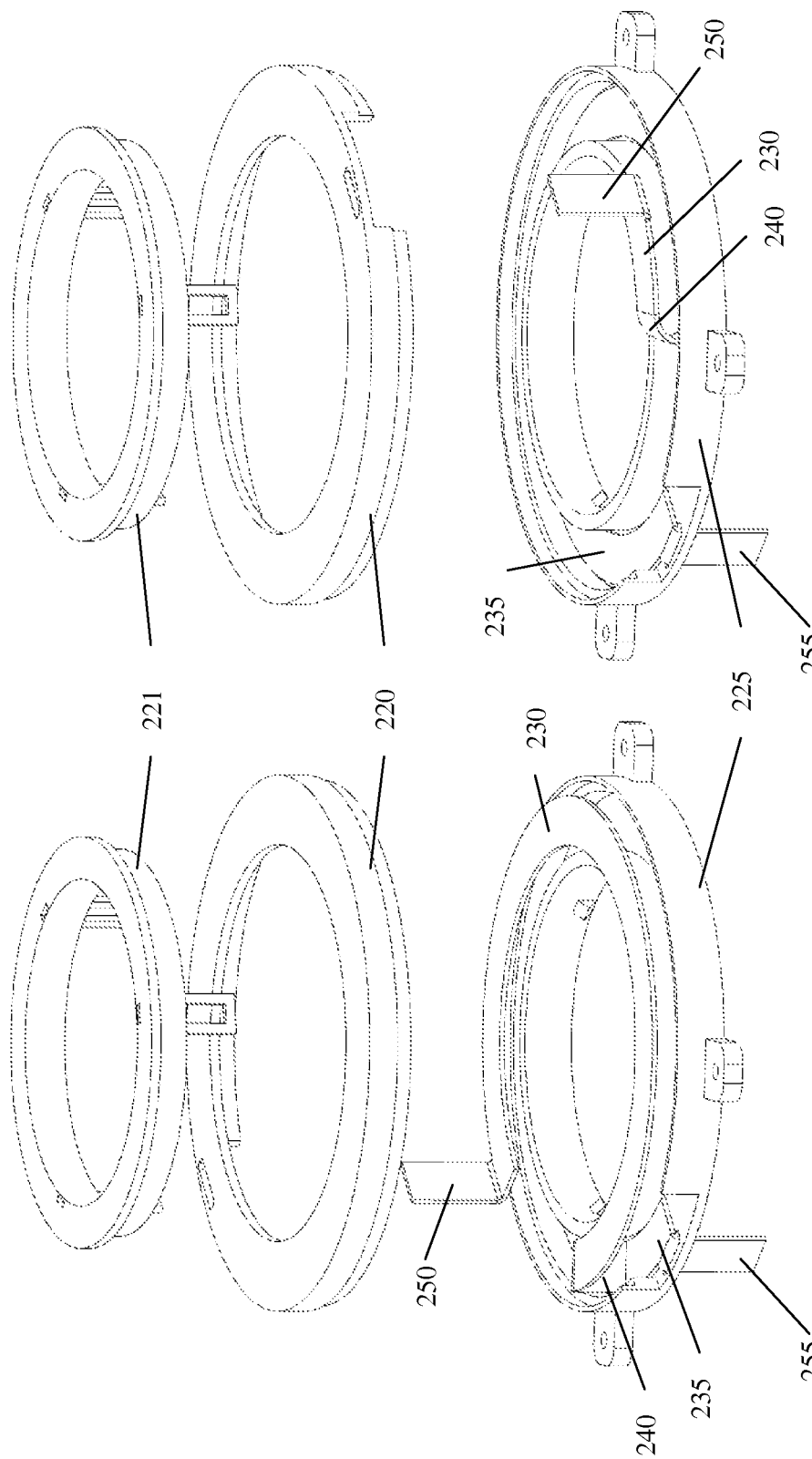

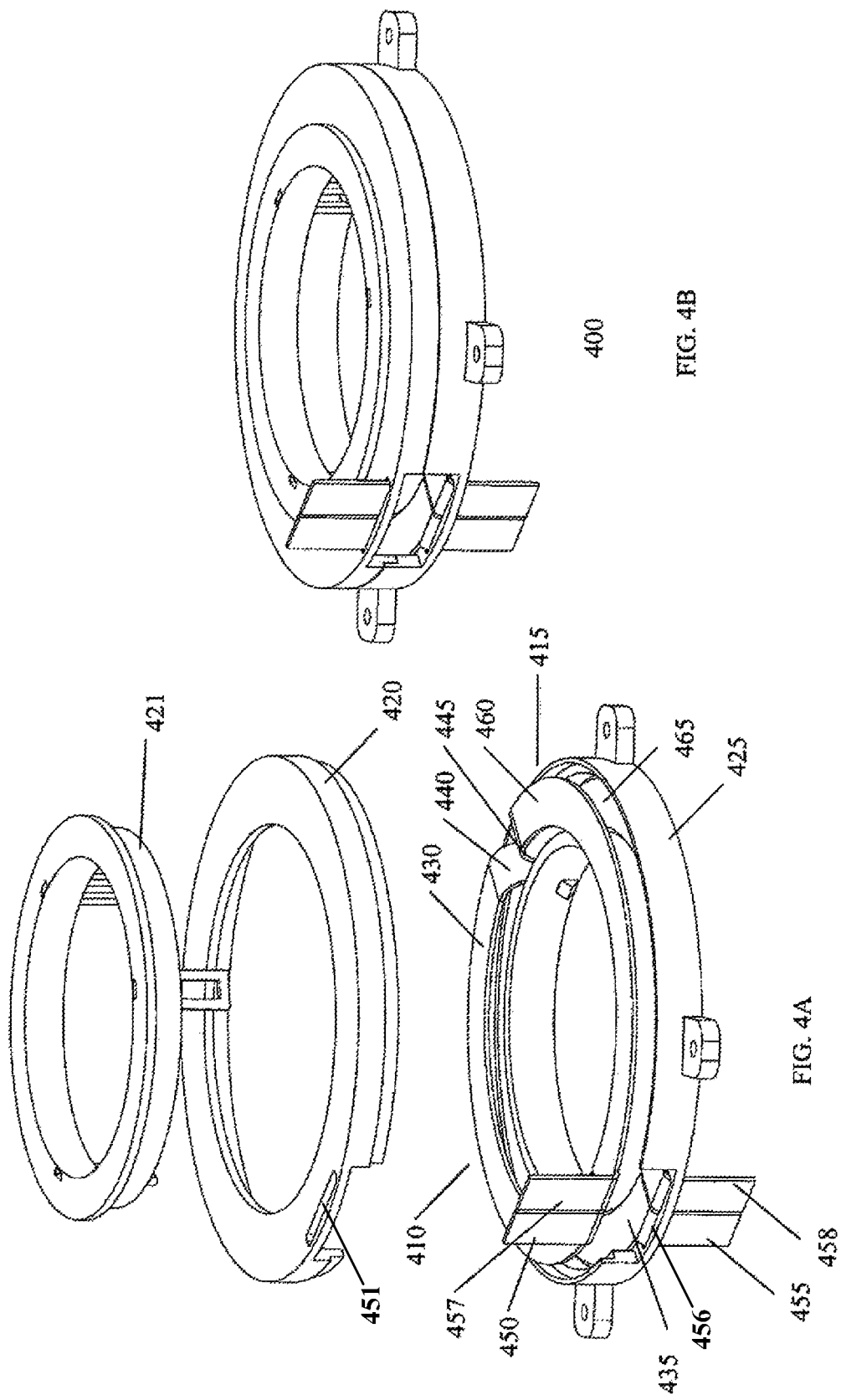

ROTARY JOINT OF A ROBOT AND THE ROBOT INCLUDING THE SAME

FIELD OF INVENTION

Embodiments of the present application generally relate to robot, and particularly relate to a rotary joint of robot which includes a hollow wiring unit employing flexible printed circuit board. Embodiments of the present application further relates to a robot including the same.

BACKGROUND OF INVENTION

For industrial robots, especially the ones designed to work in limited and complex workspaces, flexibility and compactness are among the major design requirements.

A robot typically comprises one or more rotary joints in order to achieve flexible positioning of robot arms. Generally, the larger the rotation ranges of rotary joints are, the more flexible a robot is. However, in order to transmit power and various signals to and from robot arms, one or more cables typically go through each rotary joint, and these cables cannot bear too much bending and twisting for a long time, which has become one of the major difficulties for large rotation ranges of rotary joints.

In addition, at each rotary joint, cables and hoses were usually put together to pass through either a tube shaft or a hollow gear, which then requires either bigger shaft or gear, contradict to the compact design demand, or requires customized gear, leading to high cost.

In view of the foregoing, there is a need in the art to develop an improved rotary joint and an improved routing structure.

SUMMARY OF INVENTION

Embodiments of the present application present a novel rotary joint which is compact, cost effective, and enables a large rotation range.

In one aspect, embodiments of the present application provide a rotary joint, including a hollow gear and a hollow wiring unit having a first flexible printed circuit board therein, to allow hose to pass through both the hollow gear and the hollow wiring unit.

In an exemplary embodiment, the hollow wiring unit includes a first rotation member and a second rotation member rotatable relative to each other, and first portion of the first flexible printed circuit board is connected to the first rotation member and second portion of the first flexible printed circuit board is connected to the second rotation member.

In an exemplary embodiment, one of the first rotation member and the second rotation member of the wiring unit is driven to rotate relative to the other by the hollow gear following being driven by an actuator.

In an exemplary embodiment, the first flexible printed circuit board is bent at one or more bending portions to form at least the first portion laid in a first plane and the second portion laid in a second plane, and as the first rotation member rotates with respect to the second rotation member, at least one of the bending portions shifts along the first flexible printed circuit board.

In an exemplary embodiment, the first rotation member is rotatable with respect to the second rotation member around a rotation axis substantially perpendicular to at least one of the first plane and the second plane.

In an exemplary embodiment, the first plane and the second plane are substantially parallel.

In an exemplary embodiment, the shape of the first flexible printed circuit board prior to bending comprises a broken ring or partial ring.

In an exemplary embodiment, the shape of the first flexible printed circuit board prior to bending comprises two or more broken rings or partial rings connected by one or more connecting portions, at least one of the bending portions is arranged in one of the connecting portions, thereby forming at least a third portion and a fourth portion between the first and second portions, and as the first rotation member rotates with respect to the second rotation member, the length of at least one of the third portion and the fourth portion changes correspondingly.

In an exemplary embodiment, the first rotation member is a first half case and the second rotation member is a second half case, wherein the first half case rotatably couples to the second half case, thereby enclosing at least the first flexible printed circuit board.

In an exemplary embodiment, the first rotation member and the second rotation member are both ring-shaped.

In an exemplary embodiment, the hollow wiring unit further includes one or more supporting members at least partially sandwiched between at least the first portion and the second portion.

In an exemplary embodiment, as the first rotation member rotates with respect to the second rotation member, at least one of the supporting members rotates.

In an exemplary embodiment, the supporting member comprises a number of rollers or balls.

In an exemplary embodiment, the hollow wiring unit further comprises one or more further flexible printed circuit boards stacked together with the first flexible printed circuit board and bent together with the first flexible printed circuit board.

In an exemplary embodiment, one or more of the further flexible printed circuit boards carry no active signals during operation.

In an exemplary embodiment, the first flexible printed circuit board comprises a first end and a second end, wherein the first rotation member is connected to the first portion at the first end and the second rotation member is connected to the second portion at the second end, and the first flexible printed circuit board further comprises: a first tab arranged at the first end of the first flexible printed circuit board and inserted in a first slot in the first rotation member; and a second tab arranged at the second end of the first flexible printed circuit board and inserted in a second slot in the second rotation member.

In an exemplary embodiment, the hollow wiring unit further comprises a second flexible printed circuit board bent at one or more bending portions to form at least a fifth portion laid in the first plane and a sixth portion laid in the second plane, wherein the first rotation member is connected to the fifth portion, and the second rotation member is connected to the sixth portion, wherein as the first rotation member rotates with respect to the second rotation member, at least one of the bending portions on the second flexible printed circuit board shifts along the second flexible printed circuit board.

In an exemplary embodiment, the second flexible printed circuit board comprises: a third tab arranged at a first end of the second flexible printed circuit board and inserted in a first slot in the first rotation member; and a fourth tab arranged at a second end of the second flexible printed circuit board and inserted in a second slot in the second rotation member.

In an exemplary embodiment, the first flexible printed circuit board is belt-shaped, the first rotation member is provided with a hole, and wherein the first flexible printed circuit board is folded and the folded first flexible printed circuit board is wound around the hole.

In an exemplary embodiment, the first rotation member is provided with a hole, and the first flexible printed circuit board is wound around the hole loosely enough to allow the first portion of the first flexible printed circuit board to move relative to the second portion of the first flexible printed circuit board.

In another aspect, the present application provides a robot comprising the rotary joint according to any of the above embodiments.

Other features and advantages of embodiments of the present application will also be understood from the following description of specific exemplary embodiments when read in conjunction with the accompanying drawings, which illustrate, by way of example, the principles of the invention.

BRIEF DESCRIPTION OF THE DRAWINGS

Embodiments of the present application will be described in the sense of examples and their advantages are explained in greater detail below, with reference to the accompanying drawings, wherein:

FIG. 3A shows a wiring unit in which the first rotation member has been rotated counterclockwise with respect to the second rotation member according to an embodiment of the present application.

FIG. 3B shows a wiring unit in which the first rotation member has been rotated clockwise with respect to the second rotation member according to an embodiment of the present application.

FIG. 4A shows an exploded view of a wiring unit comprising double FPC boards according to an embodiment of the present application.

FIG. 4B shows a perspective view of a wiring unit comprising double FPC boards according to an embodiment of the present application.

Throughout the figures, same or similar reference numbers indicate same or similar elements.

DETAILED DESCRIPTION OF EMBODIMENTS

In general, embodiments of the present application provide a new rotary joint. As will be apparent from the further discussions below, one or more flexible printed circuit boards (FPC boards) are employed to provide a hollow wiring unit, and the hollow wiring unit and a hollow gear are used to develop an improved rotary joint structure.

Throughout the descriptions of various embodiments of the present application, repeated descriptions of some similar elements will be omitted.

Figure 1:
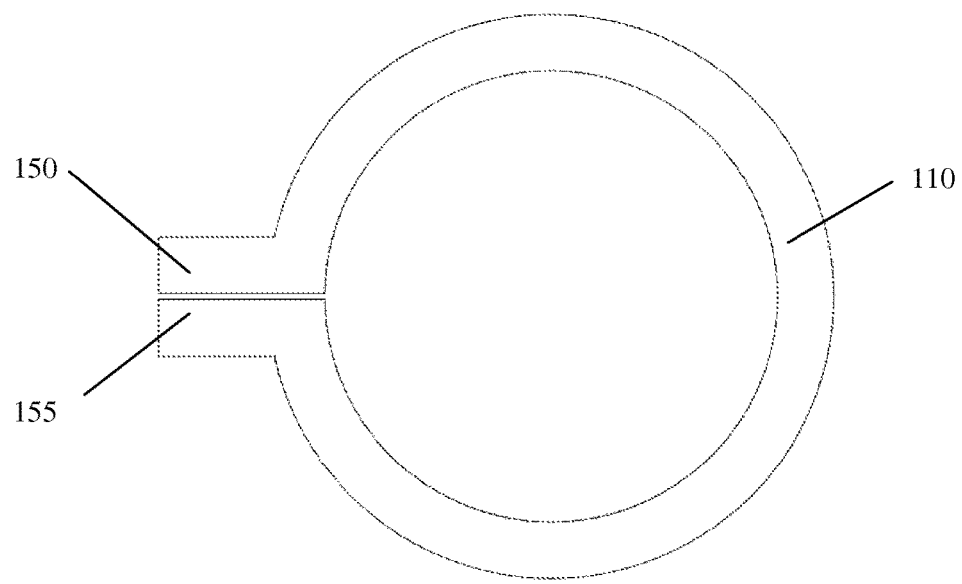
FIG. 1 shows a flexible printed circuit board (FPC board) in a shape of a broken ring for use in a wiring unit according to an embodiment of the present application.

Reference is first made to FIG. 1, which shows a FPC board 110 in a shape of a broken ring for use in a hollow wiring unit according to an embodiment of the present application.

A flexible printed circuit board (FPC board) typically refers to a circuit or wiring structure mounted on a flexible plastic substrate, such as polyimide or polyester film. A type of FPC board contains one or more printed wires for interconnecting electronic components or electronic assemblies either directly or by means of connectors. A FPC board can be as thin as 0.1 mm and can be bent with a bending radius of as small as 1 mm.

As shown in FIG. 1, a FPC board 110 is in a shape of a broken ring. The FPC board 110 comprises a first tab 150 and a second tab 155 arranged at both ends of the broken ring. The FPC board may alternatively be in a shape of a partial ring, i.e., a ring of less than 360 degrees.

Figure 2B:
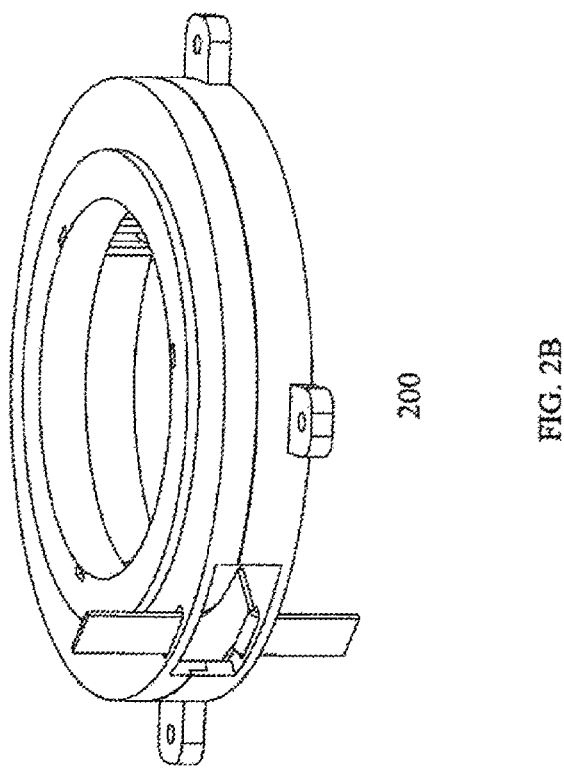
FIG. 2B shows a perspective view of a wiring unit according to an embodiment of the present application.
Figure 2A:
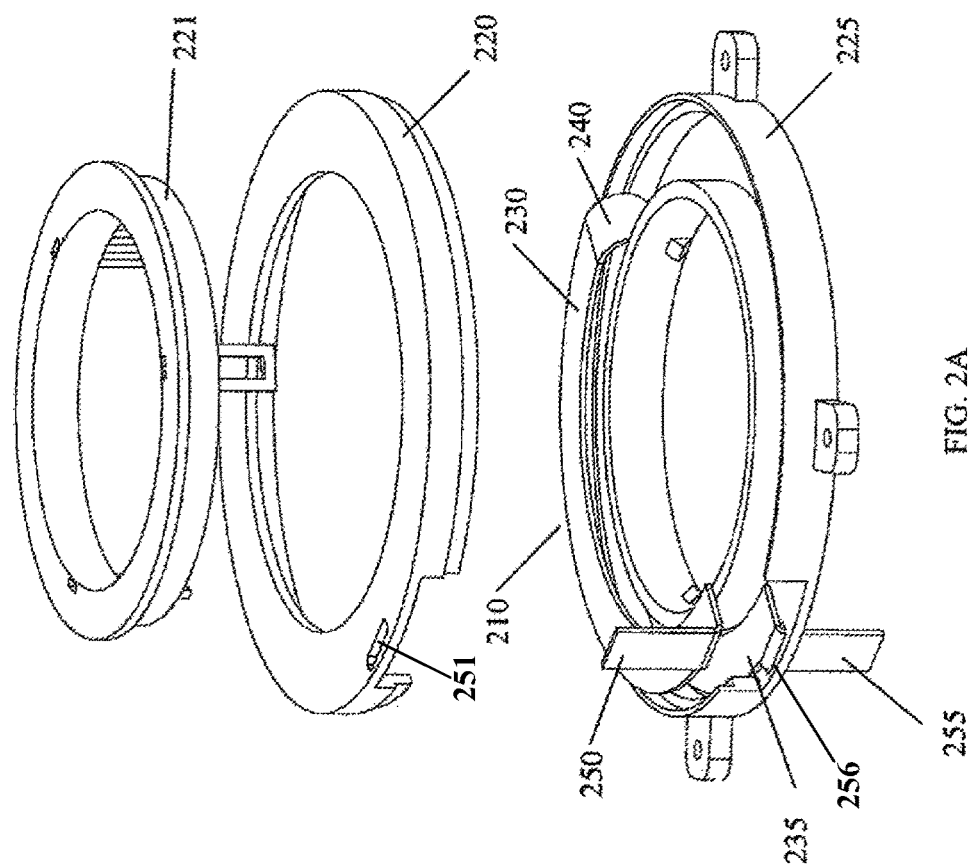
FIG. 2A shows an exploded view of a wiring unit according to an embodiment of the present application.

Reference is now made to FIGS. 2A and 2B, which respectively show an exploded view and a perspective view of a wiring unit 200 according to an embodiment of the present application.

As shown in FIG. 2A, the wiring unit 200 comprises a FPC board 210 (corresponding to the FPC board 110 in FIG. 1) bent at a bending portion 240 to from a first portion 230 laid in a first plane and a second portion 235 laid in a second plane, the first portion 230 and the second portion 235 being divided by the bending portion 240. The wiring unit 200 further comprises a first rotation member 220 connected to the first portion 230, and a second rotation member 225 connected to the second portion 235. The wiring unit 200 may further comprise an optional cover 221 for confining the movement of the first rotation member 220.

In the present embodiment, the first rotation member 220 is rotatable with respect to the second rotation member 225 around a rotation axis substantially perpendicular to at least one of the first plane and the second plane.

In the present embodiment, the first portion 230 and the second portion 235 are arranged in substantially parallel planes (i.e., the first plane and the second plane are substantially parallel), and the first portion 230 partially overlaps the second portion 235. However, the first portion 230 and the second portion 235 may be arranged in planes not parallel to each other. In this case, the first rotation member 220 and the second rotation member 225 may correspondingly be arranged at a predetermined angle.

In the case where the thickness of the FPC board 210 is about 0.1 mm, the maximum spacing between the first and second portions 230 and 235 may be as small as 2 mm. However, in order to improve the lifetime of the FPC board 210, said spacing is preferably increased to be more than 2 mm.

In the present embodiment, the first rotation member 220 is a ring-shaped first half case, and the second rotation member 225 is a ring-shaped second half case, wherein the first half case rotatably couples to the second half case, thereby enclosing the FPC board 210. The advantages of enclosing the FPC board 210 comprise providing electrical isolation, providing mechanical protection and confining the movement of the FPC board 210. The inner surfaces of the first and second half cases are preferably smooth to minimize the wearing of the FPC board 210. However, other configurations of the first and second rotation members, for example two disks, are possible.

In the present embodiment, a first tab 250 (corresponding to the first tab 150 in FIG. 1) and a second tab 255 (corresponding to the second tab 155 in FIG. 1) arranged at both ends of the broken ring are inserted in a first slot 251 in the first rotation member 220 and a second slot 256 in the second rotation member 225, respectively. Each of the first tab 250 and the second tab 255 may couple to electronic components or electronic assemblies in different parts of a robot. As the first rotation member 220 rotates with respect to the second rotation member 225, the first slot drives the first tab 250 and the second slot drives the second tab 255 in opposite directions, resulting in a rotation of the first portion 230 with respect to the second portion 235. The first and the second tabs 250 and 255 may be of any appropriate shape. It is noted that the first and second rotation members 220 and 225 may alternatively be directly connected to the first and second portions 230 and 235, respectively, without the need of the first and second tabs 250 and 255. The first and second rotation members 220 and 225 may be connected to the first and second portions 230 and 235, respectively, at any locations on the first and second portions 230 and 235.

Reference is now made to FIGS. 3A and 3B, which respectively show the wiring unit 200 in which the first rotation member has been rotated counterclockwise and clockwise with respect to the second rotation member according to an embodiment of the present application.

As shown in FIG. 3A, the first rotation member 220 has been rotated counterclockwise by 270 degrees from the home position shown in FIGS. 2A and 2B. As shown in FIG. 3B, the first rotation member 220 has been rotated clockwise by 270 degrees from the home position shown in FIGS. 2A and 2B.

As the first rotation member 220 rotates with respect to the second rotation member 225, the bending portion 240 shifts along the FPC board, and the lengths of the first and second portions 230 and 235 change correspondingly. At the same time, the position of the bending portion 240 in space rotates correspondingly. In the case of FIG. 3A, the length of the first portion 230 has become significantly larger than the length of the second portion 235. In the case of FIG. 3B, the length of the first portion 230 has become significantly smaller than the length of the second portion 235.

The clockwise rotation and counterclockwise rotation are both allowed to be close to 360 degrees. Therefore, the first rotation member 220 is allowed to rotate with respect to the second rotation member 225 by nearly 720 degrees. In the case where the shape of the FPC board prior to bending is a partial ring, the allowed rotation range is correspondingly smaller.

Reference is now made to FIGS. 4A and 4B, which show an exploded view and a perspective view of a wiring unit 400 comprising double FPC boards according to an embodiment of the present application.

The wiring unit 400 is similar to the wiring unit 200 shown in FIGS. 2A and 2B, except that the wiring unit 400 comprises a first FPC board 410 and a second FPC board 415. Repeated descriptions of some similar elements are therefore omitted.

As shown in FIG. 4A, the first FPC board 410 (corresponding to the FPC board 110 in FIG. 1) is bent at a bending portion 440 to from a first portion 430 laid in a first plane and a second portion 435 laid in a second plane, the first portion 430 and the second portion 435 being divided by the bending portion 440. The wiring unit 400 further comprises a first rotation member 420 connected to the first portion 430, and a second rotation member 425 connected to the second portion 435. The first FPC board 410 further comprises a first tab 450 and a second tab 455 arranged at both ends of the first FPC board 410.

The second FPC board 415 (also corresponding to the FPC board 110 in FIG. 1) is bent at a bending portion 445 to from a fifth portion 460 laid in the first plane and a sixth portion 465 laid in the second plane, the fifth portion 460 and the sixth portion 465 being divided by the bending portion 445. The first rotation member 420 is connected to the fifth portion 460, and the second rotation member 425 is connected to the sixth portion 465. The second FPC board 415 further comprises a third tab 457 and a fourth tab 458 arranged at both ends of the second FPC board 415.

The first and second FPC boards 410 and 415 are symmetrically arranged, with the bending portions 440 and 445 bent toward opposite circumferential directions. The first tab 450 and the third tab 457 are adjacent to each other and inserted in a first slot 451 in the first rotation member 420, and the second tab 455 and the fourth tab 458 are adjacent to each other and inserted in a second slot 456 in the second rotation member 425. As the first rotation member 420 rotates with respect to the second rotation member 425, the bending portions 440 and 445 shifts along the first and second FPC boards 410 and 415, respectively, and the lengths of the first portion 430, the second portion 435, the fifth portion 460 and the sixth portion 465 change correspondingly. It should be understood that the above is exemplary only and the first and the second FPC boards 410 and 415 do not have to be with same length and thus arranged symmetrically.

One of the advantages of providing symmetrically arranged double FPC boards is increasing signal transmitting capacity without increasing the size of the wiring unit.

Figure 5A:
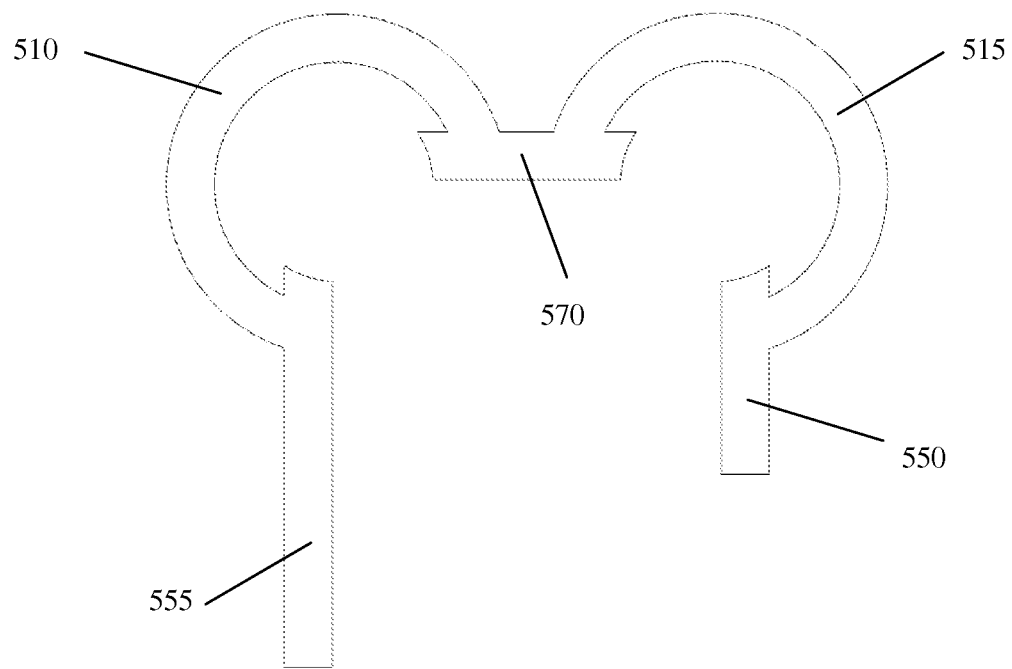
FIG. 5A shows a FPC board in a shape of two partial rings connected by a connecting portion for use in a wiring unit according to an embodiment of the present application.
Figure 5B:
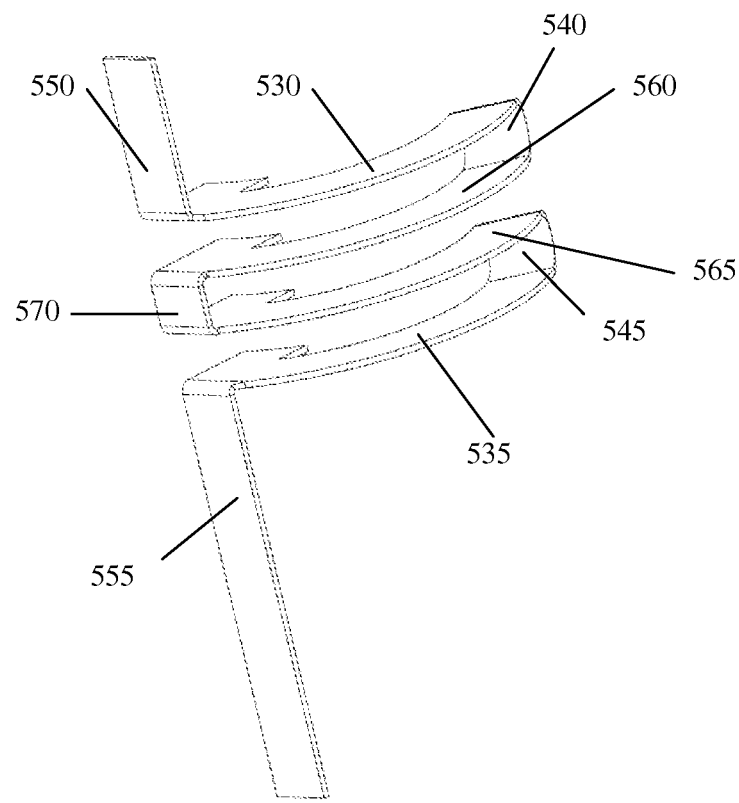
FIG. 5B shows the FPC board in FIG. 5A bent into a double-layer FPC board according to an embodiment of the present application.
Figure 5C:
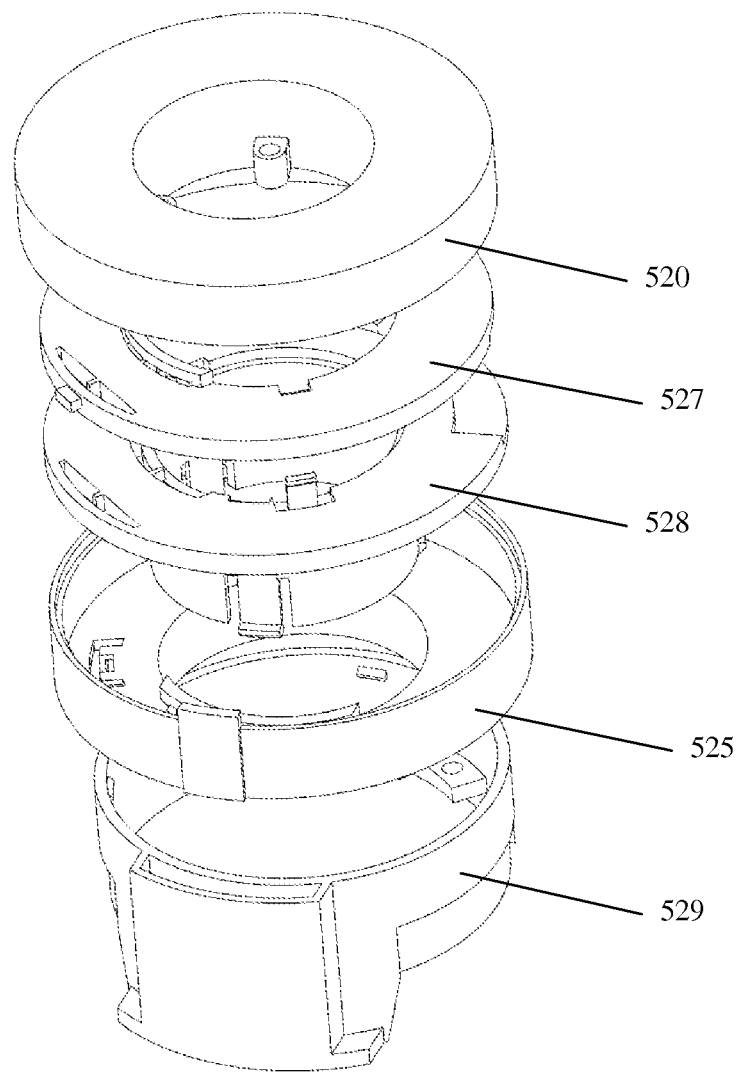
FIG. 5C shows rotation members for use with the double-layer FPC board in FIG. 5B according to an embodiment of the present application.

Reference is now made to FIGS. 5A-5C, which respectively show a FPC board in a shape of two partial rings 510 and 515 connected by a connecting portion 570 for use in a wiring unit, the FPC board in FIG. 5A bent into a double-layer FPC board, and rotation members for use with the double-layer FPC board in FIG. 5B according to an embodiment of the present application.

As shown in FIG. 5B, the FPC board is bent at bending portions 540 and 545 and a further bending portion arranged in the connecting portion 570, thereby forming a first portion 530, a second portion 535, a third portion 560 and a fourth portion 565 divided by the bending portions. The first portion 530, the second portion 535, the third portion 560 and the fourth portion 565 are arranged in different but parallel planes.

As shown in FIG. 5C, the wiring unit according to the present embodiment comprises a first rotation member 520, a second rotation member 525, a third rotation member 527 and 528, and an optional base member 529. It is noted that elements 527 and 528 of the third rotation member are fixed to each other during operation. Although the third rotation member comprising two elements 527 and 528 facilitates manufacturing and assembling of the wiring unit, the third rotation member may alternatively be composed of a single element.

The first rotation member 520 rotatably couples to the third rotation member 527 and 528. The third rotation member 527 and 528 rotatably couples to the second rotation member 525.

During operation, the first rotation member 520 is connected to the first portion 530, the second rotation member 525 is connected to the second portion 535, and the third rotation member 527 and 528 is connected to the third and fourth portions 560 and 565. The first and third portions are arranged below the first rotation member 520 and above the third rotation member 527 and 528. The second and fourth portions are arranged above the second rotation member 525 and below the third rotation member 527 and 528. The connecting portion 570 passes through the third rotation member 527 and 528. As the first rotation member 520 rotates with respect to the third rotation member 527 and 528, the bending portion 540 shifts along the FPC board and the lengths of the first portion 530 and the third portion 560 change correspondingly. As the second rotation member 525 rotates with respect to the third rotation member 527 and 528, the bending portion 545 shifts along the FPC board and the lengths of the second portion 535 and the fourth portion 565 change correspondingly.

As explained above, the first rotation member 520 is allowed to rotate with respect to the third rotation member 527 and 528 by about 720 degrees, and the second rotation member 525 is allowed to rotate with respect to the third rotation member 527 and 528 by about 720 degrees. Therefore, the first rotation member 520 is allowed to rotate with respect to the second rotation member 525 by about 1440 degrees.

It is noted that the connecting portion may be of any appropriate shape. For example, the connecting portion may be part of a ring, so that the FPC board prior to bending is of a spiral structure.

It is also noted that the FPC board may comprise more than two broken rings or partial rings, so that the rotation range of the wiring unit may be further increased.

Although it is shown in FIG. 5B that the first portion 530, the second portion 535, the third portion 560 and the fourth portion 565 are arranged on the same side (right side in FIG. 5B), it should be understood that the first portion 530 and the third portion 560 can be arranged on the opposite side (left side) from the second portion 535 and the fourth portion 565 (on right side in FIG. 5B), or vice versa.

Figure 6A:
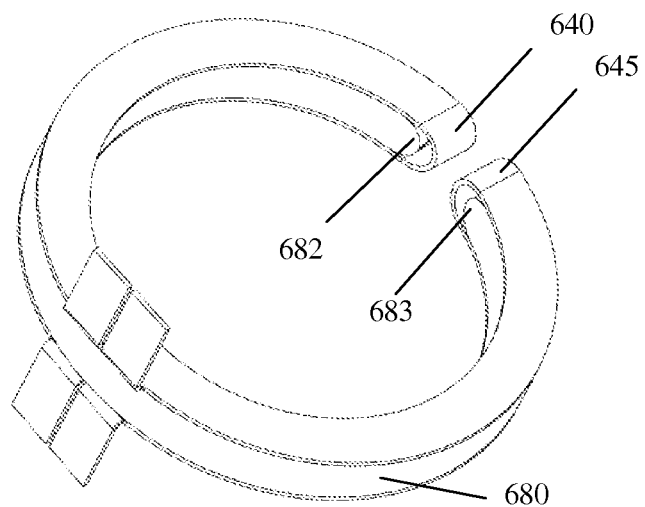
FIGS. 6A and 6B show a supporting member sandwiched between the bent portions according to an embodiment of the present application.
Figure 6B:
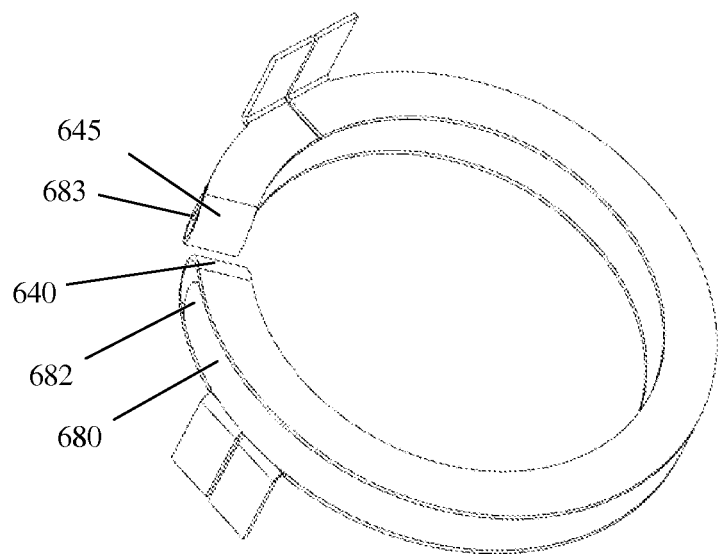

Reference is now made to FIGS. 6A and 6B, which show a supporting member 680 sandwiched between the bent portions according to an embodiment of the present application.

As shown in FIGS. 6A and 6B, the supporting member 680 is in a shape of a partial ring with a first end 682 and a second end 683, the bending portions 640 and 645 being arranged in the void space between the first and second ends 682 and 683 of the supporting member 680.

As the first rotation member rotates with respect to the second rotation member counterclockwise (as shown in FIG. 6B), the bending portion 640 also rotates counterclockwise, thereby applying a pulling force on the first end 682. In this way, the supporting member 680 is driven to rotate counterclockwise, while both FPC boards slide on the supporting member 680.

On the other hand, as the first rotation member rotates with respect to the second rotation member clockwise, the bending portion 645 also rotates clockwise, thereby applying a pulling force on the second end 683. In this way, the supporting member 680 is driven to rotate clockwise, while both FPC boards slide on the supporting member 680.

The supporting member 680 preferably has a thickness that matches the spacing between the bent portions. Also, the supporting member 680 preferably has smooth surfaces, so that the FPC board can slide on the supporting member smoothly. Furthermore, the shapes of the first and second ends 682 and 683 of the supporting member 680 preferably match the shapes of arcs formed by bending at the bending portions 640 and 645.

Figure 7:
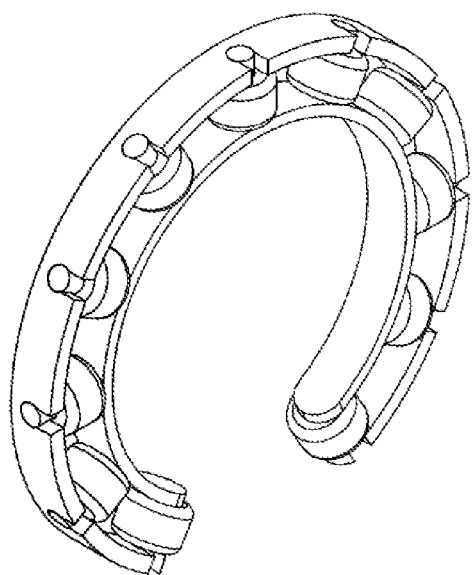
FIG. 7 shows a supporting member comprising a number of rollers according to an embodiment of the present application.

The supporting member may alternatively comprise a number of rollers or balls, which further facilitates sliding between the FPC board and the supporting member. An example of such a supporting member is shown in FIG. 7.

The advantages of employing the supporting member comprise providing electrical isolation and preventing the FPC board from wrinkling or twisting.

It is noted that although the supporting member is described in the context of double FPC boards of Embodiment 2, the concept of supporting members may also be applied to any other embodiments of the present application. In the case of single FPC board of Embodiment 1, a supporting member may be partially sandwiched between the first and second portions 230 and 235, and partially exposed. In the case of double-layer FPC board of Embodiment 3, two supporting members partially sandwiched between the first and third portions 530 and 560, and the second and fourth portions 535 and 565, respectively, may be provided.

In an embodiment of the present application, the wiring unit may further comprise one or more further FPC boards stacked together with the flexible printed circuit board(s) as described above and bent together with the flexible printed circuit board(s) as described above. In other words, the FPC boards are arranged on top of one another to form a layered structure and are bent at one or more common bending portions. During operation, the FPC boards moves together in the same manner as a single FPC board.

In an embodiment of the present application, one or more of the further FPC boards carry no active signals during operation. Such FPC boards may be referred to as inactive FPC boards. When these inactive FPC boards are arranged at the top layers or bottom layers of the layered structure, they serve as protections for the active FPC boards which carry active signals arranged at the inner layers of the layered structure.

Due to the special structure of the above wiring units, any of the above mentioned wiring units can be structured to have a through hole at the center (hereinafter referred to as "hollow wiring unit"), to allow other components such as hose to pass through.

The above describes one kind of hollow wiring unit structure employing FPC boards, but the structures of hollow wiring unit employing FPC boards are not limited to the above, and it can also adopt, but not limited to, other structures as described below.

Figure 8:
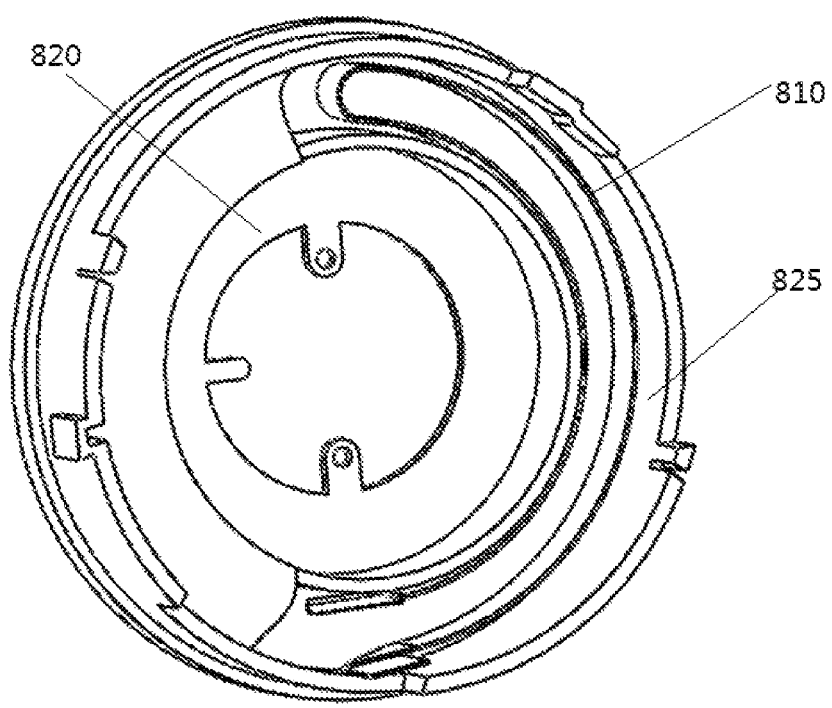
FIG. 8 shows another embodiment of a hollow wiring unit according to present application.

FIG. 8 shows another embodiment of a hollow wiring unit according to present application. As shown in FIG. 8, the hollow wiring unit includes a first rotation member 820, a second rotation member 825, and a belt-shaped FPC board 810 sandwiched therebetween. A hole is provided at, for example, center of the first rotation member 820. The FPC board 810 is folded and then the folded FPC board 810 is wound around the hole. One end of the FPC board 810 is connected with the first rotation member 820, the other end thereof is connected with the second rotation member 825. When the first rotation member 820 rotates relative to the second rotation member 825, one end of the FPC board is brought to move and thus the FPC board will be movingly wound. Further, rollers (not shown), in a manner of supporting member, can be arranged between the two parts of the folded FPC board, to facilitate the moving of two FPC board parts.

Figure 9:
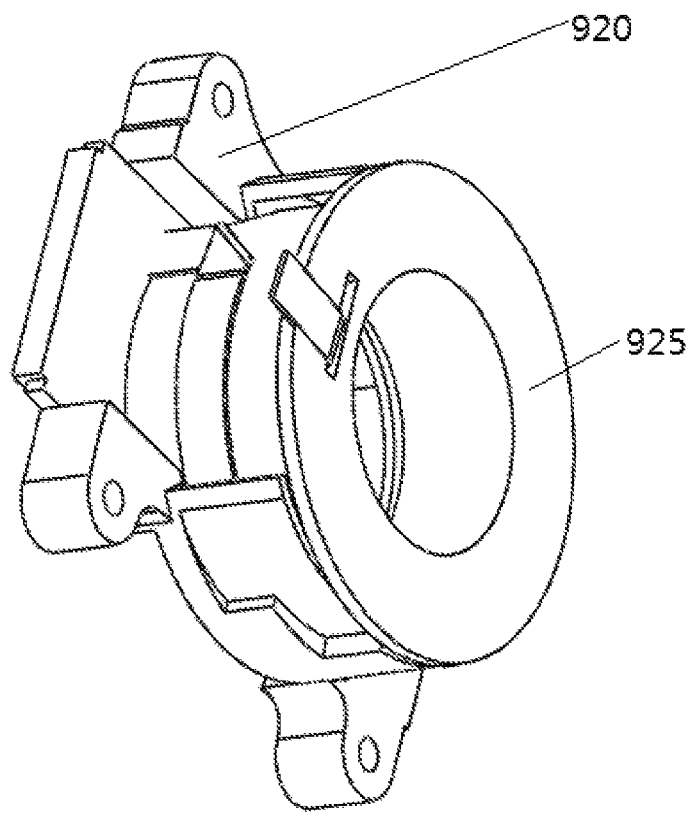
FIG. 9 shows a further embodiment of a hollow wiring unit according to present application.
Figure 10:
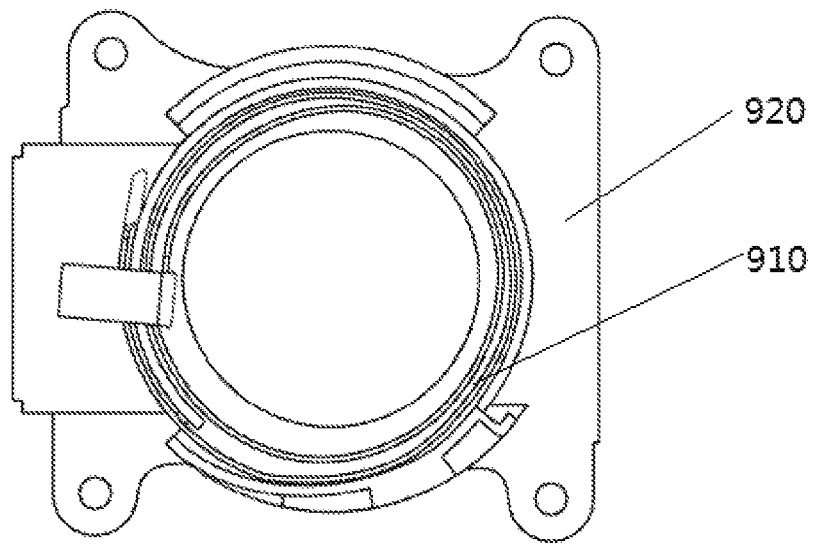
FIG. 10 shows the internal structure of the hollow wiring unit shown in FIG. 9.

FIG. 9 and FIG. 10 show a further embodiment of a hollow wiring unit according to present application. As shown in FIG. 9, the hollow wiring unit includes a first rotation member 920, a second rotation member 925, and a FPC board 910 sandwiched therebetween. A hole, for example, defined by a wall is provided, for example, at center of the first rotation member 920, and the FPC board 910 is loosely wound a few, for example two or three, laps around the wall of the hole. The winding is loose enough to allow one end of FPC board 910 to smoothly move relative to the other end of FPC board 910. One end of FPC board 910 is connected with the first rotation member 920, the other end of FPC board 910 is connected with the second rotation member 925. When the first rotation member 920 rotates relative to the second rotation member 925, one end of the FPC board is brought to move relative to the other end.

To be understood, though the above describes several embodiments of different hollow wiring unit employing FPC board, the present application shall not be limited to these specific embodiments described.

By having a hollow wiring unit, a new routing structure can be designed to facilitate compactness and reliability of rotary joint of a robot.

An embodiment of the present application proposed a new routing structure based on this hollow wiring unit. As previously mentioned, both cables and hoses are required in a robot and thus it is important to route both the cables and hoses. For cables which can transmit power and signal, the above described wiring unit can be used to improve the routing structure. However, it is hard to route hoses without changing the existing structure. According to an embodiment of the invention, a new routing structure is proposed and will be described in detail as below.

Figure 11:
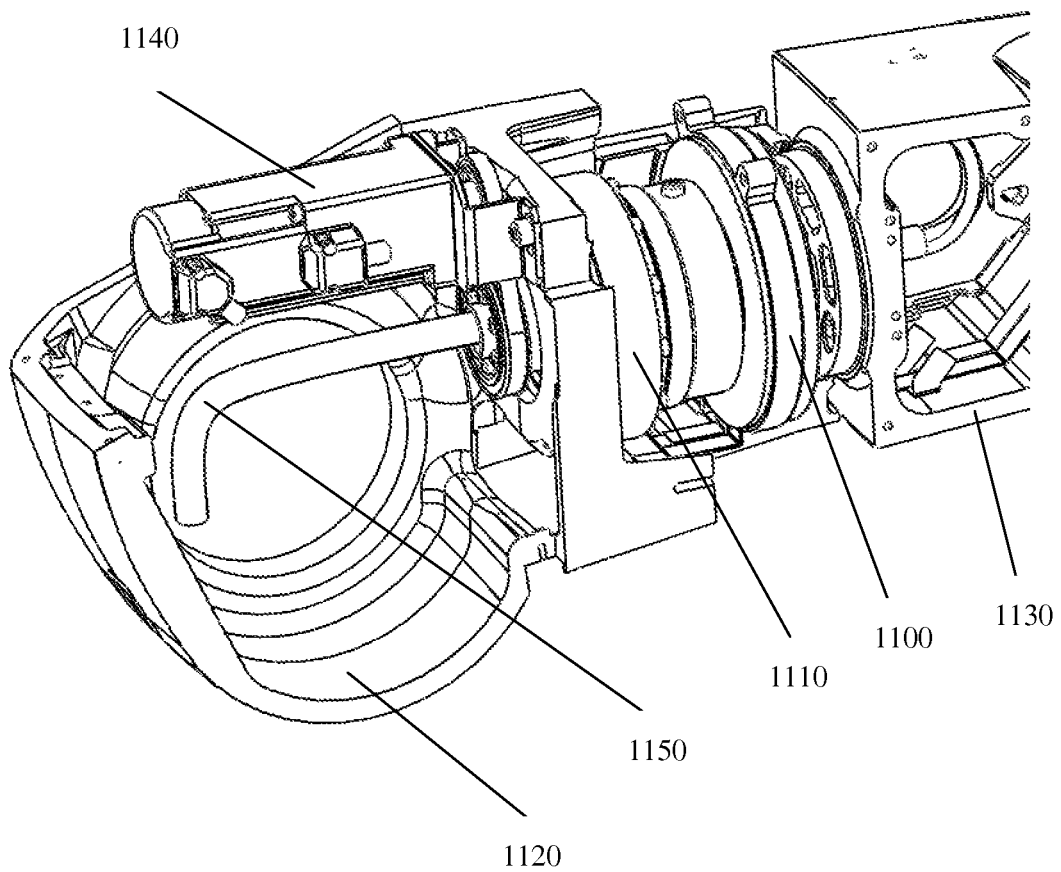
FIG. 11 shows a routing structure according to an embodiment of the present application.

As shown in FIG. 11, the routing structure includes a hollow wiring unit 1100 and a hollow gear 1110 located between a first arm 1120 and a second arm 1130. The wiring unit 1100 includes a part (for example the first rotation member) which is fixed to for example the first arm, and a part (for example the second rotation member) which is rotatable relative to the fixed part. An actuator 1140 for example a motor can be mounted to rotate the hollow gear 1110, which then rotates the rotating part of the wiring unit 1100 and the second arm 1130. The wiring unit 1100 here is a hollow wiring unit, and has a through hole at its center to allow hose 1150 pass through. The hose 1150, either an air hose or a liquid hose, can easily pass both the hollow gear 1110 and the wiring unit 1100 to establish a flow channel between the first arm 1120 and the second arm 1130. Since the wiring unit 1100 can serve as cables and be used to transmit power and signal, there is no need to have big holes in both hollow gear and wiring unit since only hose needs to pass through. Therefore, it allows use of hollow gear with relatively small hole which is benefit for cost reducing and compact design.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and sub-combinations of the various elements, features, functions and/or properties disclosed herein. Similarly, recitation in the disclosure and/or the claims of "a" or "a first" element, or the equivalent thereof, should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

Therefore, it is to be understood that the embodiments of the invention are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A rotary joint, including a hollow gear and a hollow wiring unit having a first flexible printed circuit board therein, to allow hose to pass through both the hollow gear and the hollow wiring unit;
wherein the hollow wiring unit includes a first rotation member and a second rotation member rotatable relative to each other, and first portion of the first flexible printed circuit board is connected to the first rotation member and second portion of the first flexible printed circuit board is connected to the second rotation member.

2. A robot comprising the rotary joint according to claim 1.

3. The rotary joint according to claim 1, wherein one of the first rotation member and the second rotation member of the wiring unit is driven to rotate relative to the other by the hollow gear following being driven by an actuator.

4. The rotary joint according to claim 1, wherein the first flexible printed circuit board is belt-shaped, the first rotation member is provided with a hole, and wherein the first flexible printed circuit board is folded and the folded first flexible printed circuit board is wound around the hole.

5. The rotary joint according to claim 1, wherein the first rotation member is provided with a hole, and the first flexible printed circuit board is wound around the hole loosely enough to allow the first portion of the first flexible printed circuit board to move relative to the second portion of the first flexible printed circuit board.

6. A rotary joint, including a hollow gear and a hollow wiring unit having a first flexible printed circuit board therein, to allow hose to pass through both the hollow gear and the hollow wiring unit;
wherein the first flexible printed circuit board is bent at one or more bending portions to form at least a first portion laid in a first plane and a second portion laid in a second plane, and as a first rotation member rotates with respect to a second rotation member, at least one of bending portions shifts along the first flexible printed circuit board;

wherein a shape of the first flexible printed circuit board prior to bending comprises a broken ring or partial ring.

7. The rotary joint according to claim 6, wherein the first rotation member is rotatable with respect to the second rotation member around a rotation axis substantially perpendicular to at least one of the first plane and the second plane.

8. The rotary joint according to claim 6, wherein a shape of the first flexible printed circuit board prior to bending comprises two or more broken rings or partial rings connected by one or more connecting portions, at least one of the bending portions is arranged in one of the one or more connecting portions, thereby forming at least a third portion and a fourth portion between the first and second portions, and as the first rotation member rotates with respect to the second rotation member, a length of at least one of the third portion and the fourth portion changes correspondingly.

9. The rotary joint according to claim 6, wherein the first flexible printed circuit board comprises a first end and a second end, wherein the first rotation member is connected to the first portion at the first end and the second rotation member is connected to the second portion at the second end, and the first flexible printed circuit board further comprises: a first tab arranged at the first end of the first flexible printed circuit board and inserted in a first slot in the first rotation member; and a second tab arranged at the second end of the first flexible printed circuit board and inserted in a second slot in the second rotation member.

10. The rotary joint according to claim 9, wherein the hollow wiring unit further comprises a second flexible printed circuit board bent at one or more bending portions to form at least a fifth portion laid in the first plane and a sixth portion laid in the second plane, wherein the first rotation member is connected to the fifth portion, and the second rotation member is connected to the sixth portion, wherein as the first rotation member rotates with respect to the second rotation member, at least one of the bending portions on the second flexible printed circuit board shifts along the second flexible printed circuit board.

11. The rotary joint according to claim 10, wherein the second flexible printed circuit board comprises:

a third tab arranged at a first end of the second flexible printed circuit board and inserted in a first slot in the first rotation member; and a fourth tab arranged at a second end of the second flexible printed circuit board and inserted in a second slot in the second rotation member.

12. A rotary joint, including a hollow gear and a hollow wiring unit having a first flexible printed circuit board therein, to allow hose to pass through both the hollow gear and the hollow wiring unit;

wherein the first flexible printed circuit board is bent at one or more bending portions to form at least a first portion laid in a first plane and a second portion laid in a second plane, and as a first rotation member rotates with respect to a second rotation member, at least one of bending portions shifts along the first flexible printed circuit board;

wherein the first rotation member is rotatable with respect to the second rotation member around a rotation axis substantially perpendicular to at least one of the first plane and the second plane;

wherein the first plane and the second plane are substantially parallel; and wherein the first rotation member is a first half case and the second rotation member is a second half case, wherein the first half case rotatably couples to the second half case, thereby enclosing at least the first flexible printed circuit board.

13. The rotary joint according to claim 12, wherein the first rotation member and the second rotation member are both ring-shaped.

14. The rotary joint according to claim 12, wherein the hollow wiring unit further includes one or more supporting members at least partially sandwiched between at least the first portion and the second portion.

15. The rotary joint according to claim 14, wherein as the first rotation member rotates with respect to the second rotation member, at least one of the supporting members rotates.

16. The rotary joint according to claim 15, wherein the supporting member comprises a number of rollers or balls.

* * * * *